Dec. 14, 1965  L. I. BENJAMEN  3,222,953
TORSION-KEYED VIBRATION DAMPER
Filed May 27, 1963

INVENTOR.
Lysle I. Benjamen
BY
Barnard, McGlynn & Reising
ATTORNEYS

United States Patent Office 3,222,953
Patented Dec. 14, 1965

3,222,953
TORSION-KEYED VIBRATION DAMPER
Lysle I. Benjamen, 951 N. Adams, Birmingham, Mich.
Filed May 27, 1963, Ser. No. 283,357
4 Claims. (Cl. 74—574)

This invention relates to a vibration damper or harmonic balancer for rotatable drive shafts and, in particular, to a torsion-keyed damper or balancer adapted to be coupled to the rotatable crankshaft of the internal combustion engine of a vehicle to dampen vibrations therein, as well as to provide a means for accurately timing the engine.

Vibration dampers or harmonic balancers of the type aforementioned are, generally speaking, well known in the art and typically comprise, particularly in recent times, an assembly comprising a first or inner drive member adapted to be drivingly coupled to the engine crankshaft for direct rotation therewith externally of the engine, a second or outer inertia member of preselected or predetermined inertia mass surrounding the first member, and a resilient means such as rubber or rubber-like elastomers, particularly neoprene, compressed between cooperating frictional drive surfaces of the aforementioned members to frictionally couple the latter for rotation together as the crankshaft rotates.

As will be readily apparent to those acquainted with this damper or balancer art, after assembly of the aforementioned members and resilient means therebetween, the assembly may be statically balanced in a manner generally analogous to statically balancing the wheel rim and tire of an automotive vehicle. In addition, or in some instances without first statically balancing the assembly, such assembly is mated to the crankshaft of the particular engine with which it is to be employed and dynamically balanced with respect thereto, again in a manner generally analogous to dynamically balacing the wheel rim and tire of an automotive vehicle. Thus, in balancing the assembly either statically or dynamically or both, it is conventional practice to drill holes or otherwise remove material in selected places from the aforementioned second or outer inertia member or to add slugs of material or otherwise add weight in selected places thereto, all for the purpose of balancing the entire assembly. Thus, after so balancing the assembly, the entire assembly is intended to rotate with the crankshaft resulting in the outer or inertia mass member oscillating to a limited angular extent relative to the inner member as the entire assembly rotates to dampen vibrations in the crankshaft as induced by the various engine components operatively connected thereto such as the pistons, camshafts and the like.

In addition, it has been proposed heretofore to provide a timing indicia or mark on the periphery of the outer or inertia mass member of the damper or balancer assembly in a preselected or predetermined angular position with respect to the crankshaft with which the assembly is mated, which indicia is cooperable with an indicator or the like suitably fixed adjacent the path of rotative travel of the outer or inertia mass member of the assembly whereby, with the engine running and the crankshaft and assembly rotating, the engine may be timed in a conventional manner to cause the indicia on the outer or inertia mass member to pass opposite the fixed indicator aforementioned in timed relation with the ignition cycle of the engine.

Such prior damper or balancer assemblies have been found to pose very significant and serious problems with respect to both the damping or balancing function which they are intended to provide and the engine timing function. More specifically, it has been found that the resilient rubbers or elastomers, neoprene being a good example, usually employed due to their fine aging characteristics to frictionally couple the inner and outer members of the assembly together lose their elasticity as ambient temperatures decrease, thus reducing the radial forces imposed thereby against the cooperating frictional drive surfaces of the inner and outer members. As a result, the frictional drive connection between the resilient means and one or the other or both of the inner and outer members of the assembly is reduced thereby drastically reducing the torque loads required to cause the resilient means to break away or slip angularly relative to one or the other or both of such members and, consequently, upon imposition of such a torque load on the assembly, a permanent angular displacement of the outer member relative to the inner member would occur. While a sufficiently high torque load to result in such breakaway or slip may occur simply due to dynamic forces imposed on the assembly as the mass of the outer or inertia member oscillates in the usual manner relative to the inner member, additional sufficiently high torque loads may be imposed on the assembly in those instances, quite common, in which the outer member of the assembly also serves as a pulley having a belt entrained thereabout to drive various auxiliary devices or appliances such as a generator pulley, radiator fan, or various types of pumps.

By way of further specific illustration of the effect of ambient temperature changes on a damper or balancer assembly of the type aforementioned, and merely by way of example since the actual figures will vary from installation to installation, in one damper or balancer assembly tested using a neoprene resilient frictional drive sleeve to interconnect the inner and outer members thereof, it has been demonstrated that the torque at which the aforementioned breakaway or slip will occur holds relatively steady at approximately 4500 inch lbs. throughout a temperature range of approximately 80° F. to 140° F., and then gradually falls as temperature increases but relatively slightly, being approximately 4000 in. lbs. at 200° F. However, rather drastic decreases in the torque load required for breakaway or slip occur at the other end of the temperature spectrum. Thus, as the temperature decreases from 80° F., the torque required to cause breakaway or slip becomes approximately 3000 in. lbs. at approximately 50° F. and approximately 2500 in. lbs. at approximately 20° F. In other words, the torque load capable of being taken by the assembly tested prior to breakaway or slip at approximately 20° F. is approximately 37.5% less than the torque loads which may be absorbed in the temperature range from approximately 80° F. to 140° F.

Consequently, normal torque loads imposed on the damper or balancer assembly may exceed the reduced torque loads capable of being absorbed or transmitted in the critical temperature range below 80° F. resulting in the aforementioned breakaway or slip of the resilient frictional drive material of the assembly and, in the final analysis, permanent relative angular displacement of the outer inertia member of the assembly relative to the inner member and the crankshaft to which the assembly is mounted, which is totally unacceptable both from the standpoint of the vibration damping or balancing function sought to be provided by the assembly, as well as in timing the engine as aforementioned.

More specifically, and referring to the vibration damping problem aforementioned, it will be readily apparent that relative angular or circumferential shifting of the outer inertia member relative to the inner member will result in an imbalance in the entire assembly either statically, dynamically or both. Consequently, the assembly is rendered totally or partially inoperable to function in an optimum fashion for damping vibrations. Furthermore, since the timing indicia is placed in a predetermined or preselected position on the outer member of the assembly relative to the crankshaft of the engine, it will be readily apparent that the aforementioned breakaway or slip results in moving such indicia to another position relative to the crankshaft. As a result, the indicia will not be aligned with the cooperating fixed timing indicator aforementioned at a time when the engine is properly timed; in other words, the timing indicia no longer occupies its preselected position with respect to the crankshaft, thereby preventing proper timing of the engine. In such circumstances, it has been the usual practice to remove the damper or balancer assembly from a given vehicle and to replace such assembly with a completely new assembly at considerable cost as will be appreciated by those acquainted with this art.

In view of the foregoing considerations, it is a principal object and feature of this invention to provide a vibration damper or balancer assembly for a drive shaft, particularly the rotatable crankshaft of a vehicle engine, comprising a first member adapted to be drivingly coupled to such a shaft for rotation with the latter, a second member having a predetermined or preselected inertia mass for the purpose of damping vibrations within the shaft, and a resilient means frictionally drivingly interconnecting such members for rotation together and permitting relative oscillation of the aforementioned second member relative to the first member as such members rotate with the shaft to dampen vibrations in the latter, while positively yet resiliently preventing permanent angular displacement of the second member relative to the first member even if ambient temperatures fall to a point at which the resilient driving means would be incapable due to friction alone to prevent such displacement.

More specifically, it is an object and feature of this invention to provide an assembly of the general type aforementioned comprising a first or driving member adapted to be coupled to the crankshaft of an internal combustion engine for direct rotative drive therefrom, a second annular inertia member of predetermined inertia mass extending about such first member, such members respectively including radially spaced and opposed circumferentially extending cylindrical frictional drive surfaces including a plurality of radially opposed circumferentially spaced drive pockets, and a generally cylindrical sleeve of resilient material such as rubber, elastomers such as neoprene and the like having a plurality of circumferentially spaced cylindrical nodules or enlargements thereon radially compressed respectively between the aforementioned drive surfaces with the nodules disposed in the cavities formed by each opposed pair of the pockets aforementioned, whereby such sleeve including the nodules or enlargements thereon permit oscillation of the second member relative to the first member as the entire assembly rotates with the crankshaft to dampen vibrations in the latter, while the aforementioned nodules or enlargements compressed and confined within the aforementioned pockets cooperate with the latter to key the two members of the assembly resiliently together to prevent any permanent angular displacement of the second member relative to the inner member irrespective of the effect of ambient temperature.

Furthermore, it is yet another object and feature of this invention to provide a damper or balancer assembly of the general type aforementioned further comprising indicia means located in a predetermined or preselected position on the outer or second member of the assembly and relative to the crankshaft of an engine for cooperation with an indicator member fixed adjacent to the assembly for the purposes of timing the engine, thereby preventing any inadvertent angular displacement of the indicia from its preselected position aforementioned and accurate timing of the engine irrespective of the effect of ambient temperature changes as aforedescribed.

These and other objects, features and advantages of the invention will appear more fully hereinafter as the description thereof proceeds, reference being made to the accompanying drawings in which.

Figure 1:
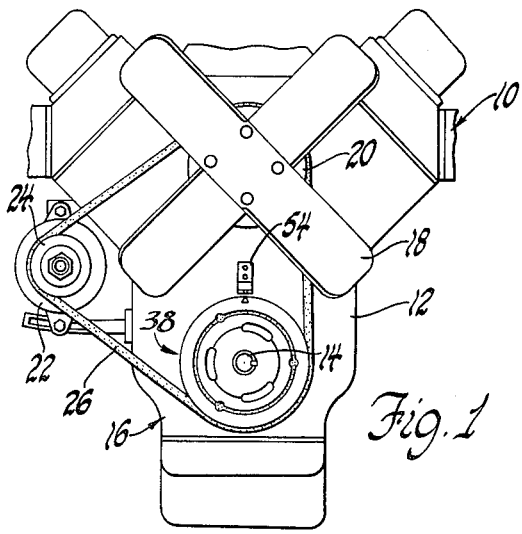
FIGURE 1 is a front elevation of the internal combustion engine of an automotive vehicle, and illustrates a preferred embodiment of the invention.

Referring now to the drawings, the numeral 10 in FIGURE 1 generally indicates an internal combustion engine of the type employed on automotive passenger vehicles and comprising the usual engine block 12 housing the usual combustion chambers including the reciprocable pistons thereof connected to the rotatable crankshaft 14 extending longitudinally of the block and protruding from the front end thereof. Naturally, the engine is provided with the usual valves, means for supplying a fuel-air mixture to the combustion chambers thereof and an ignition system for exploding such mixture within the respective combustion chambers at predetermined timed intervals as will be readily apparent. A combined vibration damper or balancer and rotary motion transmitting pully assembly is indicated generally at 16 as being coupled to the end of the crankshaft externally of the engine block for direct rotative drive therefrom as will be described hereinafter. The engine includes the usual radiator fan 18 suitably rotatably mounted thereon and including the rotatable pulley member 20, and a conventional generator 22 including a rotatable pulley member 24 is also shown mounted on the engine in FIGURE 1 of the drawings, a conventional flexible pulley belt 26 being entrained about the pulley members 20 and 24 and the assembly 16, whereby rotary motion is transmitted from the crankshaft through the assembly 16 to the generator and fan in a conventional manner. In this regard, it will be appreciated that loads other than the fan and generator may be imposed through the belt and pulley arrangement aforementioned on the assembly 16 such as, for example, various pumps, air-conditioning compressors and the like.

Figure 3:
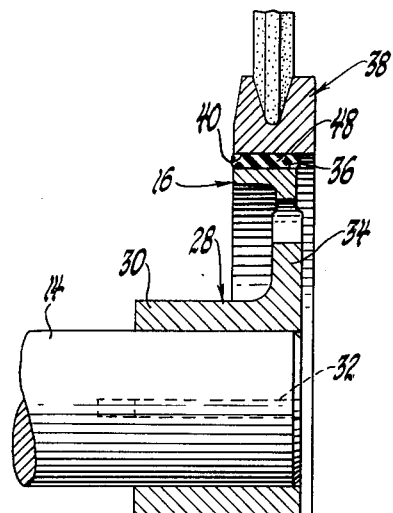
FIGURE 3 is a sectional view taken generally along line 3—3 of FIGURE 2.
Figure 2:
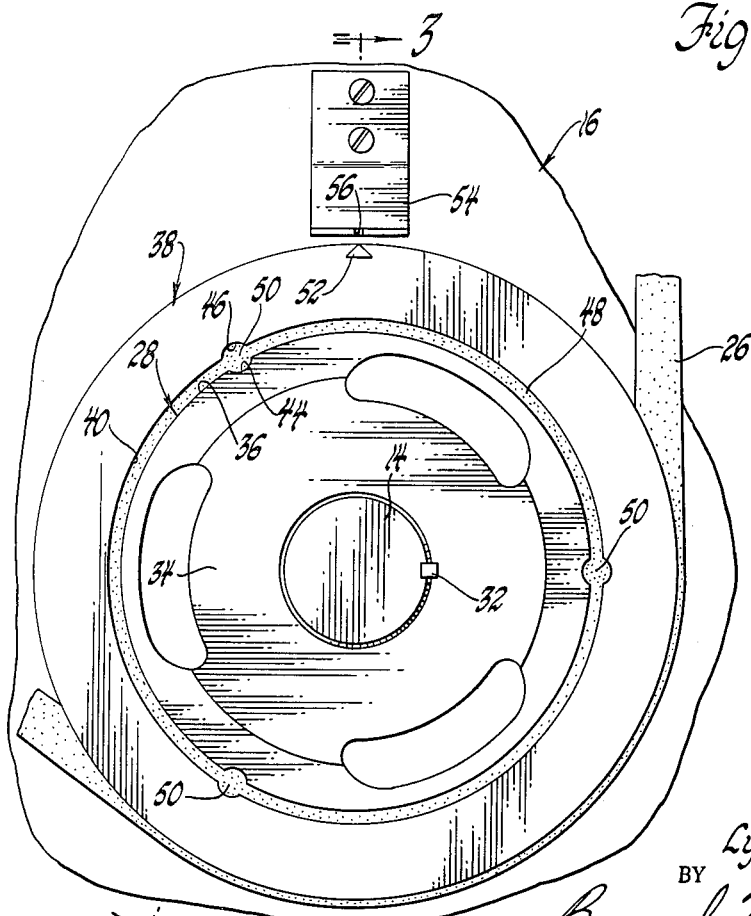
FIGURE 2 is an enlarged fragmentary view of a portion of FIGURE 1 illustrating certain details of the invention.

Referring now primarily to FIGURES 2 and 3, it may be seen that the assembly 16 comprises the inner driving member indicated generally at 28 and including the hub 30 having an axial bore therethrough to receive the end of the crankshaft 14 in front of the block 12, the usual key construction 32 being provided axially of the hub 30 and crankshaft 14 to orient the member 28 angularly or circumferentially relative to the crankshaft and to connect the latter to such member for direct rotative drive therebetween. The member 28 also includes the annular radially projecting wall member 34 terminating in an axially extending radially outwardly presented generally cylindrical frictional drive surface 36 disposed coaxially with the axis of the hub 30.

The assembly 16 further comprises an outer or driven inertia member of annular or circular configuration indicated generally at 38 and including an axially extending radially inwardly presented generally cylindrical frictional drive surface 40 radially spaced from the drive surface 36 on the inner member 28 and extending circumferentially thereabout. The radially outer periphery of the member 38 includes a groove 42 of generally V-shaped configuration as appears particularly in FIGURE 3 to entrain the belt 26 previously described.

The drive surface 36 of the inner member 28 and the drive surface 40 of the outer member 38 respectively include a plurality of circumferentially spaced parti-cylindrical drive pockets 44 and 46, respectively, which are respectively radially recessed within their associated drive surfaces in directly radially opposed relation to define generally cylindrical cavities at spaced locations between the members 28 and 30. While the number of such pockets and cavities may vary, three are known as being spaced 120° apart. A resilient drive connection or mass of suitable material, such as neoprene, includes the generally cylindrical sleeve-like body 48 having a plurality of cylindrical nodules or enlargements 50 formed integral or otherwise suitably secured rigidly thereto, the number and spacing of the nodules or enlargements corresponding to the number and spacing of the aforementioned radially opposed pairs of pockets 44 and 46. The sleeve-like body 48 is radially compressed between the respective drive surfaces 36 and 40 with the respective nodules or enlargements radially compressed between the radially opposed pairs of drive pockets 44 and 46. In this regard, the relative radial spacing between the members 28 and 38 and their cooperating drive surfaces and drive pockets are such relative to the unstressed radial thickness of the sleeve-like body 48 and the nodules or enlargements 50 so that, upon installing the body and its nodules or enlargements between the members, the body and nodules or enlargements are compressed radially to a considerable extent such as 40% of their unstressed radial thicknesses although, of course, the amount of compression may vary from installation to installation. In this regard, the sleeve is compressed sufficiently to apply radial forces to the drive surfaces 36 and 40 of the respective members 28 and 38 to frictionally couple such members together for rotation with the crankshaft 14, while transmitting torque through the belt 26 to the generator 22 and radiator fan 18 or other loads imposed thereon.

The outer inertia member 38 includes suitable indicia 52 adjacent the periphery thereof which is preoriented or located in a predetermined or preselected position angularly with respect to the key construction 32 and, hence, the crankshaft 14 of the particular engine involved. An indicator pointer 54 including a notch or other indicia 56 cooperable with indicia 52 is suitably fixedly mounted relative to the engine block 12, as on the cover for the conventional timing gear not shown, so as to cooperate in timing the engine as will appear hereinafter.

In operation, the inner and outer members 28 and 38 with the resilient driving means installed therebetween may be statically balanced if desired by removing material from or adding material to the assembly as is well known in the art and as alluded to above. Thereafter, the assembly may be installed on the crankshaft 14 and, since the inner member 28 assumes a predetermined angular relationship with respect to the crankshaft due to the key construction 32, the indicia 52 on the outer member may be thereby suitably located with respect to the crankshaft for timing the engine in a conventional manner. Furthermore, with the engine running, the assembly 16 is dynamically balanced in a conventional manner with respect to that particular engine and crankshaft to harmonically balance or dampen vibrations therein.

Thus, with the engine running, the outer inertia member 38 is permitted to oscillate to a limited angular or circumferential extent with respect to the inner member 28 by the resilient sleeve-like body 48 and the nodules or enlargements 50 forming a part thtreof, thereby damping vibrations in a conventional manner. In this regard, while the nodules or enlargements 50 cooperate with the corresponding drive pockets 44 and 46 to, in effect, key the members 28 and 38 against relative circumferential displacement, the inherent resiliency of the sleeve-like body and nodules or enlargements permits the oscillation aforementioned. However, to the extent that torque loads imposed on the assembly tend to cause breakaway or slip as aforedescribed which would result in the outer member 38 shifting circumferentially and being permanently displaced relative to the inner member as aforementioned, the keyed connection between nodules 50 and drive pockets 44 and 46 prevent such displacement. In this regard, the nodules or enlargements 50 have a tendency to wind up about their axes extending parallel to the axis of the hub 30, which results in drawing portions of the sleeve-like body 48 to each side of the nodules into the opposed drive pockets confining the latter. As a result, the volume of the elastomer or the like in the opposed pockets increases, thereby further greatly increasing resistance to slip or breakaway of the elastomer or the like relative to the drive surfaces 36 and 40.

Even as ambient temperatures reach a critical range for any given installation whereby the radial forces applied by the compressed elastomer to the drive surfaces 36 and 34 are decreased, the nodules or enlargements continue to provide a keyed connection as aforedescribed between the members 28 and 38 to at all times prevent breakaway or slip and permanent angular or circumferential displacement of the outer member 38 relative to the inner member 28. As a consequence, the original built-in static or dynamic balance, or both, of the assembly remains undisturbed notwithstanding such temperature changes.

In addition, since the construction aforedescribed prevents permanent angular or circumferential displacement of the outer member 38 with respect to the inner member 28, the indicia 52 at all times remains in its aforementioned predetermined or preselected position with respect to the crankshaft 14 for cooperation with the indicia on the indicator 54. Accordingly, the engine may be timed in a conventional manner to cause the indicia 52 to pass opposite the indicator 54 in timed relation with a desired ignition cycle.

In view of the aforegoing description, it will now be apparent that the present invention comprehends a rubber or elastomer material such as neoprene or the like to resiliently frictionally interconnect the inner and outer members of a vibration damping or harmonic balancer assembly in such a manner as to permit the desired and required oscillation of the inertial mass of the outer member of the assembly for vibration damping purposes, while providing a resilient yet positive key connection between the members of the assembly to prevent any permanent relative angular or circumferential displacement therebetween. Consequently, the assembly remains in static and dynamic balance during normal usage, and the timing indicia associated therewith are not susceptible to dislodgement from a predetermined relationship which would otherwise prevent correct timing of the engine.

While the one form of the invention has been shown and described, other forms will now be apparent to those skilled in the art. Therefore, it will be understood that the embodiment shown in the drawing and described above is merely for illustrative purposes, and is not intended to limit the scope of the invention which is defined by the claims which follow.

I claim:

1. A vibration damper for the rotatable crankshaft of an internal combustion engine comprising a drive member adapted to be drivingly coupled to a crankshaft for rotation with the latter, means defining a cylindrical frictional drive surface extending about the periphery of said member and including a plurality of circumferentially spaced radially inwardly recessed and radially outwardly facing parti-cylindrical drive pockets, a second member of predetermined inertia mass extending about said first member, means defining a cylindrical frictional drive surface on said second member radially spaced from and extending circumferentially about said first-named surface and including a plurality of circumferentially spaced radially outwardly recessed and radially inwardly facing parti-cylindrical drive pockets disposed radially opposite from said respective first-named drive pockets, and a unitary resilient cylindrical drive sleeve radially compressed between said surfaces and including a plurality of circumferentially spaced nodules respectively compressed between radially opposed pairs of said pockets to frictionally drivingly connect said members for rotation together, said sleeve and said nodules permitting said second member to oscillate circumferentially to a limited extent relative to said first member as the latter rotates with a crankshaft to dampen vibrations in the latter, while said nodules and said respective pockets resiliently key said members circumferentially to prevent permanent angular displacement of said second member circumferentially relative to said first member.

2. A vibration damper for the rotatable crankshaft of an internal combustion engine comprising a first annular member adapted to be coupled to a crankshaft for direct rotatable drive therefrom, a second annular member of predetermined inertia mass extending about said first member, said first and second members respectively including radially spaced and opposed circumferentially extending cylindrical frictional drive surfaces including a plurality of radially opposed circumferentially spaced parti-cylindrical drive pockets, and a unitary resilient cylindrical drive sleeve radially compressed between said surfaces and including a plurality of circumferentially spaced cylindrical nodules respectively radially compressed between radially opposed pairs of said pockets to frictionally drivingly connect said members for rotation together, said sleeve and said nodules permitting said second member to oscillate circumferentially to a limited extent relative to said first member as said members rotate with the crankshaft to dampen vibrations in the latter, while said nodules and said respective pockets resiliently key said members circumferentially to prevent permanent displacement of said second member circumferentially relative to said first member.

3. A vibration damper for the rotatable crankshaft of an engine comprising a first member adapted to be coupled to a crankshaft for rotation with the latter, a second member of predetermined inertia mass to dampen crankshaft vibrations, said members respectively including radially spaced opposed annular frictional drive surfaces and a plurality of radially opposed annularly spaced parti-cylindrical drive pockets, and unitary resilient means comprising a sleeve-like body and a plurality of spaced nodules projecting radially therefrom, said body including said nodules being respectively radially compressed between said surfaces and radially opposed pairs of said pockets, whereby said resilient means permits said members to oscillate to a limited extent relative to each other as they rotate with a crankshaft to dampen vibrations in the latter while said nodules resiliently key said members against permanent relative angular displacement.

4. A vibration damper for the rotatable crankshaft of an engine comprising a first member adapted to be coupled to a crankshaft for rotation with the latter, a second member of predetermined inertia mass to dampen crankshaft vibrations, said members respectively including radially spaced opposed annular frictional drive surfaces and a plurality of radially opposed annularly spaced parti-cylindrical drive pockets, and unitary resilient means including a sleeve-like body and a plurality of spaced generally cylindrically shaped nodules projecting radially therefrom, said body including said nodules being respectively radially compressed between said surfaces and radially opposed pairs of said pockets whereby said resilient means permits said members to oscillate angularly to a limited extent relative to each other as they rotate with a crankshaft to dampen vibrations in the latter, the axes of said nodules being disposed generally parallel to the axis of such shaft whereby said respective nodules tend to wind up about their axes to draw portions of said body to each side of a respective nodule into the associated radially opposed drive pockets to resiliently key said members against permanent relative angular displacement.

References Cited by the Examiner

UNITED STATES PATENTS

| | | | |
|---|---|---|---|
| 1,939,855 | 12/1933 | Kreis | 74—574 |
| 1,944,233 | 1/1934 | Hann | 74—574 |
| 2,505,120 | 4/1950 | Jackson | 74—574 |
| 3,058,321 | 10/1962 | Aske | 64—11 |
| 3,088,332 | 5/1963 | Arnt | 74—574 |

FOREIGN PATENTS 313,851  8/1930  Great Britain.

MARK NEWMAN, *Primary Examiner.*

FRED E. ENGELTHALER, *Examiner.*